(12) United States Patent
Huha et al.

(10) Patent No.: US 8,139,323 B2
(45) Date of Patent: Mar. 20, 2012

(54) MATERIAL DEPOSITION ON TRANSDUCING HEAD

(75) Inventors: Marsha Anne Huha, Minneapolis, MN (US); Ki Myung Lee, Eden Prairie, MN (US); Anil Junuthula Reddy, Minneapolis, MN (US); Ying Dong, Eden Prairie, MN (US); Gary Joseph Kunkel, Minneapolis, MN (US); Matthew Aaron Carper, Minneapolis, MN (US); Andrew David Frenz, Minneapolis, MN (US); John L. Brand, Burnsville, MN (US); Quinn Jay Haddock, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 7 days.

(21) Appl. No.: 12/701,362

(22) Filed: Feb. 5, 2010

(65) Prior Publication Data

US 2011/0195275 A1 Aug. 11, 2011

(51) Int. Cl.
*G11B 5/33* (2006.01)
*G11B 5/40* (2006.01)
(52) U.S. Cl. ................ 360/234.3; 428/815.1; 360/235.1
(58) Field of Classification Search ................... None
See application file for complete search history.

(56) References Cited

U.S. PATENT DOCUMENTS

| | | | |
|---|---|---|---|
| 5,490,025 A | 2/1996 | Dorius et al. | |
| 5,742,451 A | 4/1998 | Kubota et al. | |
| 5,793,568 A | 8/1998 | Smith | |
| 5,796,551 A | 8/1998 | Samuelson | |
| 6,014,288 A | 1/2000 | Cha et al. | |
| 6,160,683 A | 12/2000 | Boutaghou | |
| 6,359,754 B1 | 3/2002 | Riddering et al. | |
| 6,529,347 B2 | 3/2003 | Hipwell et al. | |
| 6,663,817 B1 * | 12/2003 | Chang et al. | 264/400 |
| 6,674,612 B2 | 1/2004 | Boutaghou et al. | |
| 6,920,015 B2 * | 7/2005 | Mundt et al. | 360/235.6 |
| 6,956,718 B1 | 10/2005 | Kulkarni et al. | |
| 2002/0048120 A1 * | 4/2002 | Boutaghou et al. | 360/236.3 |
| 2004/0223256 A1 * | 11/2004 | Feng et al. | 360/122 |
| 2007/0042154 A1 * | 2/2007 | Hancer et al. | 428/64.1 |
| 2007/0268622 A1 | 11/2007 | Martin | |
| 2008/0253021 A1 | 10/2008 | Pust et al. | |

OTHER PUBLICATIONS

K.B. Park et al., "Evaluation of the plasticity index as a scuffing criterion", Wear, 175 (1994) pp. 123-131.

* cited by examiner

*Primary Examiner* — Kevin Bernatz
(74) *Attorney, Agent, or Firm* — Kagan Binder, PLLC

(57) ABSTRACT

An apparatus includes a slider body having a leading edge and an opposite trailing edge, as well as a top face and a bottom face each extending between the leading edge and the trailing edge. The slider body further includes a plurality of protrusions extending from the bottom face, a first recess defined on one of the protrusions, and a sacrificial layer deposited on the slider body in the recess. A bottom surface of the sacrificial layer extends at least as far from the bottom face as bottom surfaces of the plurality of protrusions. In another aspect, a first blocking feature is located at a first uptrack edge on an air bearing surface of a slider, with the first blocking feature being substantially continuous along the first uptrack edge and protruding outwardly from the air bearing surface to reduce particle interaction with the air bearing surface.

20 Claims, 8 Drawing Sheets

MATERIAL DEPOSITION ON TRANSDUCING HEAD

BACKGROUND

In data storage systems, including hard disc drives (HDDs), slider-disc contact can cause scratching of the magnetic storage medium and can lead to data loss. Further, particles generated by scratching can lead to latent data loss or other decreases in HDD performance. Particles can also be generated in other ways. One particular problem is that particles can accumulate on surfaces inside the HDD and later shed to the magnetic storage media, increasing a risk of unwanted magnetic erasures or other forms of performance degradation.

It is desired to limit the creation of particles in a data storage system in the first instance, and further, or in the alternative, to reduce undesired effects of any particles that are present.

SUMMARY

An apparatus according to one aspect of the present invention includes a slider body having a leading edge and an opposite trailing edge, as well as a top face and a bottom face each extending between the leading edge and the trailing edge. The slider body further includes a plurality of protrusions extending from the bottom face, a first recess defined on one of the protrusions, and a sacrificial layer deposited on the slider body in the recess. A bottom surface of the sacrificial layer extends at least as far from the bottom face as bottom surfaces of the plurality of protrusions.

In another aspect of the present invention, a method includes creating a plurality of protrusions that collectively define an air bearing surface of a slider, milling a recess at the air bearing surface to a depth D, and depositing a sacrificial material in the recess to a thickness equal to or greater than the depth D.

In yet another aspect of the present invention, an apparatus includes a slider body having a leading edge and an opposite trailing edge, as well as a top surface and a bottom surface each extending between the leading edge and the trailing edge, an air bearing surface protruding outwardly from a portion of the bottom surface and having a first uptrack edge proximate the leading edge, and a first blocking feature located at a first uptrack edge on the air bearing surface. The first blocking feature is substantially continuous along the first uptrack edge and protruding outwardly from the air bearing surface to reduce particle interaction with the air bearing surface.

DETAILED DESCRIPTION

Figure 1A:
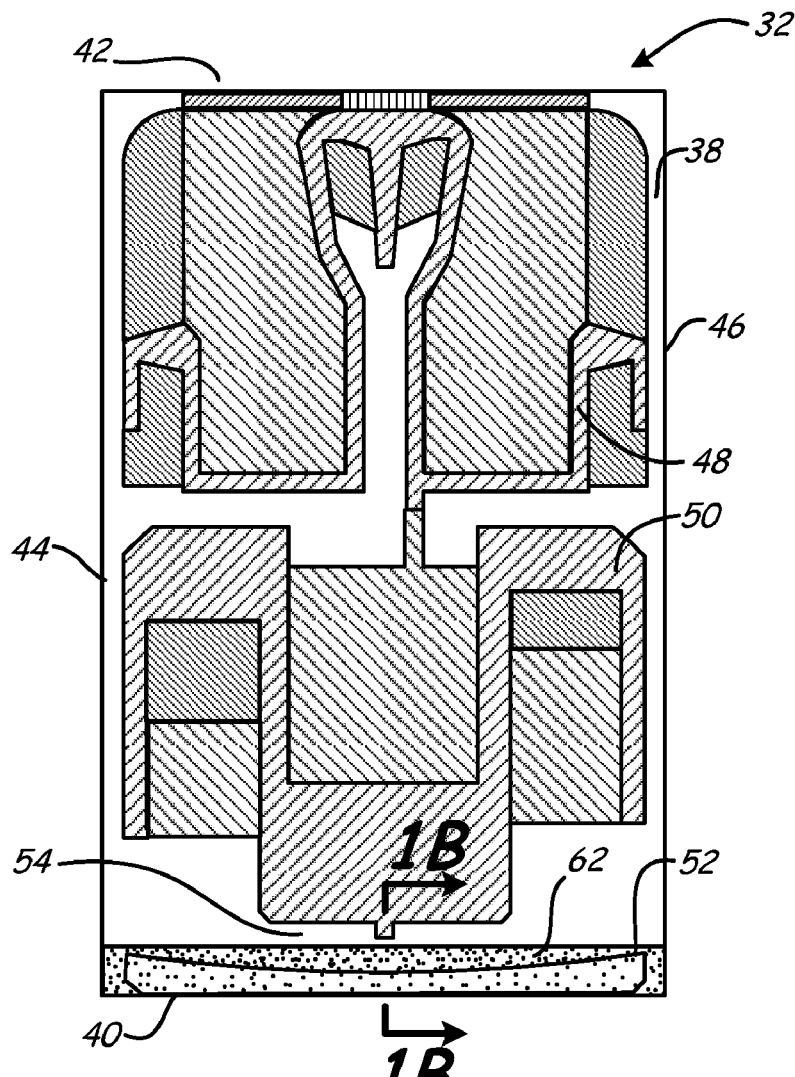
FIG. 1A is an air bearing surface (ABS) view of a slider according to the present invention.
Figure 1B:
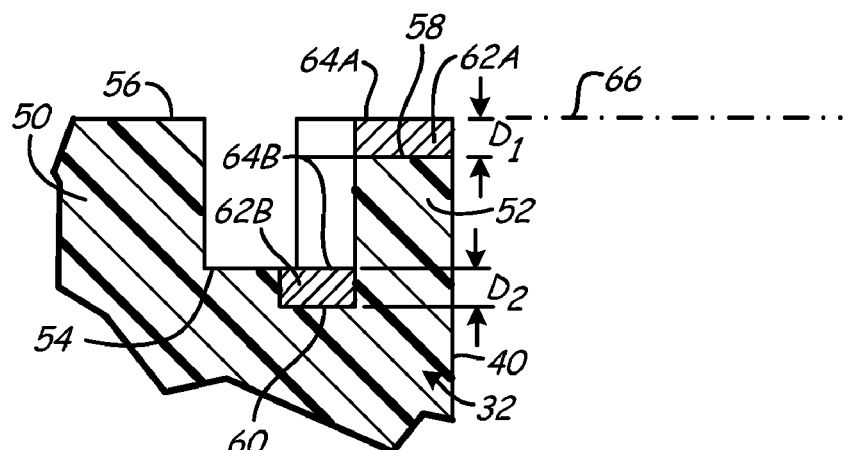
FIG. 1B is a cross-sectional view of the slider, taken along line 1B-1B of FIG. 1A.

FIG. 1A is an air bearing surface (ABS) view of a slider 32 having a slider body 38 with a leading edge 40, a trailing edge 42, and opposite lateral edges 44 and 46. For clarity, portions of the slider 32 in FIG. 1A are hatched to represent surfaces at different heights. FIG. 1B is a cross-sectional view of the slider body 38, taken along line 1B-1B of FIG. 1A. The slider body 38 is typically made of a ceramic material, such as AlOTiC. A number of protrusions 48, 50 and 52 extend from the slider body 38, and can be integral with the remainder of the slider body 38. In the illustrated embodiment, the protrusion 52 forms a comb structure adjacent to the leading edge 40 of the slider body 38. The protrusion 48 is located adjacent to the trailing edge 42 (and extends uptrack, such as relative to a storage medium track), and the protrusion 50 is located in between the protrusions 48 and 52. The protrusions 48, 50 and 52 are noncontiguous (i.e., not contiguous with each other). For instance, the protrusion 52 is spaced from the protrusion 50, with a cavity 54 defined therebetween. The cavity 54 refers to a region or regions lower than or recessed from an air bearing surface (ABS), and can have a uniform or varying depth.

In the illustrated embodiment, the protrusions 48 and 50 each have a bottom surface 56. A recess 58 is formed in the protrusion 52, which defines a recessed surface along substantially the entire protrusion 52 in the illustrated embodiment. The recess 58 has a depth $D_1$. Also, as illustrated, another recess 60 is formed in the slider body 38 within the cavity 54, and is located immediately adjacent to the recess 58 in the protrusion 52. The recess 60 has a depth $D_2$. In the illustrated embodiment, the depths $D_1$ and $D_2$ are substantially equal. In one embodiment, the depths $D_1$ and $D_2$ are each approximately 350 Å. In another embodiment, the depths $D_1$ and $D_2$ can each be less than or equal to about 450 Å. In still further embodiments, nearly any depths $D_1$ and $D_2$ can be utilized.

A sacrificial layer of material 62 is located on the slider body 38. As illustrated in FIGS. 1A and 1B, the sacrificial layer of material 62 is deposited on the slider body 38 within a rectangular area (i.e., having a substantially rectangularly shaped perimeter) that entirely encompasses the protrusion 52. The sacrificial layer of material 62 includes a first portion 62A and a second portion 62B. The first portion 62A is located in the recess 58, and the second portion 62B is located in the recess 60. The first and second portions 62A and 62B each have a bottom surface 64A and 64B, respectively. A thickness of the first portion 62A is substantially equal to the depth $D_1$ of the recess 58, and a thickness of the second portion 62B is substantially equal to the depth $D_2$ of the recess 60. Alternatively, the thickness of the first and/or second portions 62A and 62B of the sacrificial layer of material 62 can be greater than the depths $D_1$ and $D_2$ of the recesses 58 and 60, respectively. The sacrificial layer of material 62 can be made of amorphous coatings such as diamond-like carbon (DLC), $SiO_2$, sputtered C and $Al_2O_3$. Table 1 summarizes elastic modulus and hardness values (in GPa) for certain materials that can be used in conjunction with the present invention. In general, the sacrificial layer of material 62 has a lower hardness and lower elastic modulus than the ceramic material of the slider body 38 (including the protrusions 48, 50 and 52). More particularly, the sacrificial layer of material 62 is typically made of a material with a lower Hertzian contact potential than the ceramic material of the slider body 38. That relationship can also be assessed in terms of a plasticity index, and in some embodiments, a plasticity index for the sacrificial layer of material 62 is less than approximately 0.6.

TABLE 1

|  | DLC | $SiO_2$ | $Al_2O_3$ | Sputtered Amorphous C | AlOTiC |
|---|---|---|---|---|---|
| Elastic modulus (GPa) | 100 | 70 | 130 | 90 | 390 |
| Hardness (GPa) | 15-22 | 6.2 | 9 | 10-15 | 29 |

The respective bottom surfaces 56 of each of the protrusions 48 and 50 and the bottom surface 64A of the portion 62A of the sacrificial layer of material 62 on the protrusion 52 collectively define an ABS, and lie substantially within a single plane 66. The illustrated configuration of the ABS is shown by way of example, and not limitation. Those of ordinary skill in the art will recognize that the particular configuration of protrusions 48, 50 and 52 that, at least in part, define the ABS can vary as desired for particular applications, and, for instance, the particular shapes, arrangements and sizes of each of the protrusions 48, 50 and 52 can be modified to produce desired flying characteristics of the slider body 38.

Because the thickness of the first portion 62A of the sacrificial layer of material 62 is substantially equal to the depth $D_1$ of the recess 58, the sacrificial layer of material 62 extends to and partially defines the ABS. In that way, the sacrificial layer of material 62 in the recess 58 can essentially replace a desired amount of the ceramic material of the protrusion 52 while maintaining a given ABS configuration. The thicknesses of the first and second portions 62A and 62B of the sacrificial layer of material 62, corresponding to the depths $D_1$ and $D_2$, can be selected to accommodate and anticipated amount of wear over an expected life of the HDD 20. In alternative embodiments, the thickness of the sacrificial layer of material 62 can be greater than the corresponding depth $D_1$ or $D_2$ of the recess 58 or 60 such that the sacrificial layer of material 62 protrudes above the ABS to provide performance benefits such as decreased particle sensitivity due to the blocking of particles from downtrack ABS features.

The presence of the sacrificial layer of material 62 in the recess 60 helps reduce a risk of any localized discontinuities (or "spikes") along the ABS. Due to relatively small manufacturing tolerances, it may be possible for slightly non-planar discontinuities between the location of the bottom surfaces of the sacrificial layer of material 62 and the ceramic material of the slider body 38 surrounding the recess 60 to occur at the perimeter of the sacrificial layer of material 62. Such discontinuities may undesirably lead to scratching of the storage medium 22. However, by positioning the recess 60 within the cavity 54, any potential discontinuity at the perimeter of the sacrificial layer of material 62 would be located within the cavity 54, and therefore spaced from the ABS, which helps reduce a risk of such a discontinuity scratching the storage medium 22 during operation.

Figure 2:
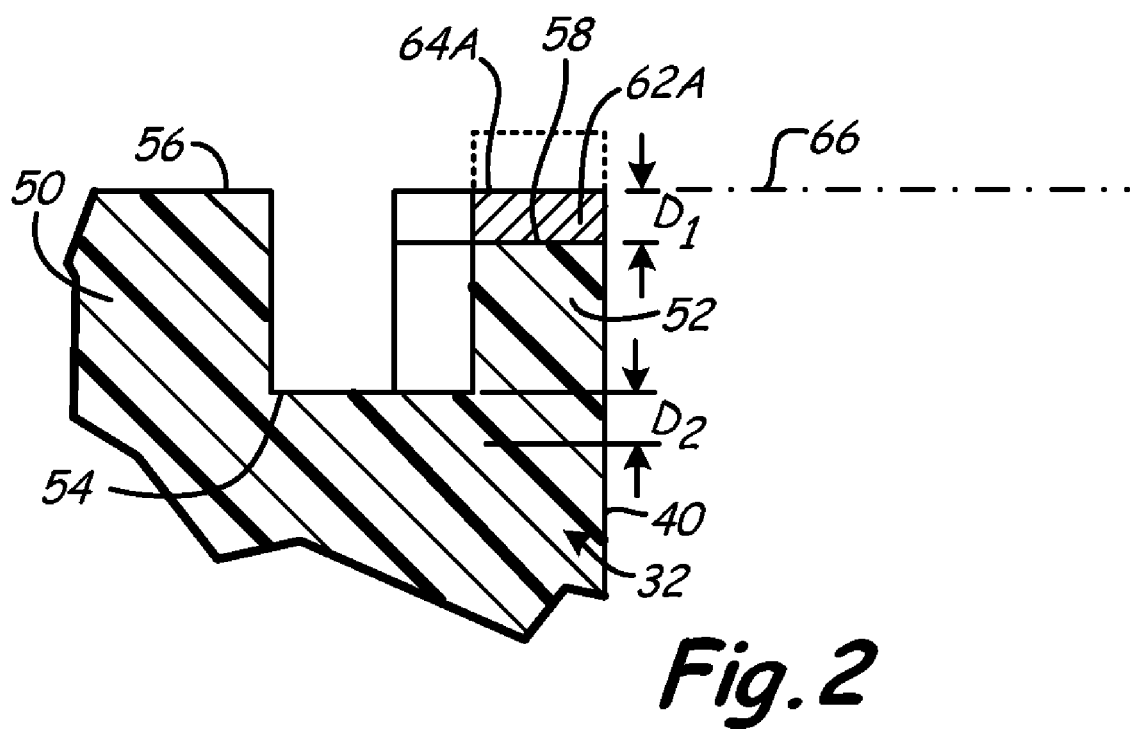
FIG. 2 is a cross-sectional view of another slider according to the present invention.

FIG. 2 is a cross-sectional view of a slider 32 (generally similar to that described above with respect to FIGS. 1A and 1B) in which the sacrificial layer of material 62 is deposited on the slider body 38 in the recess 58, but not within the cavity 54. Dashed lines indicate that in some embodiments the depth $D_1$ of the sacrificial layer of material 62 can extend beyond the ABS 66 to provide additional particle mitigation.

Figure 3:
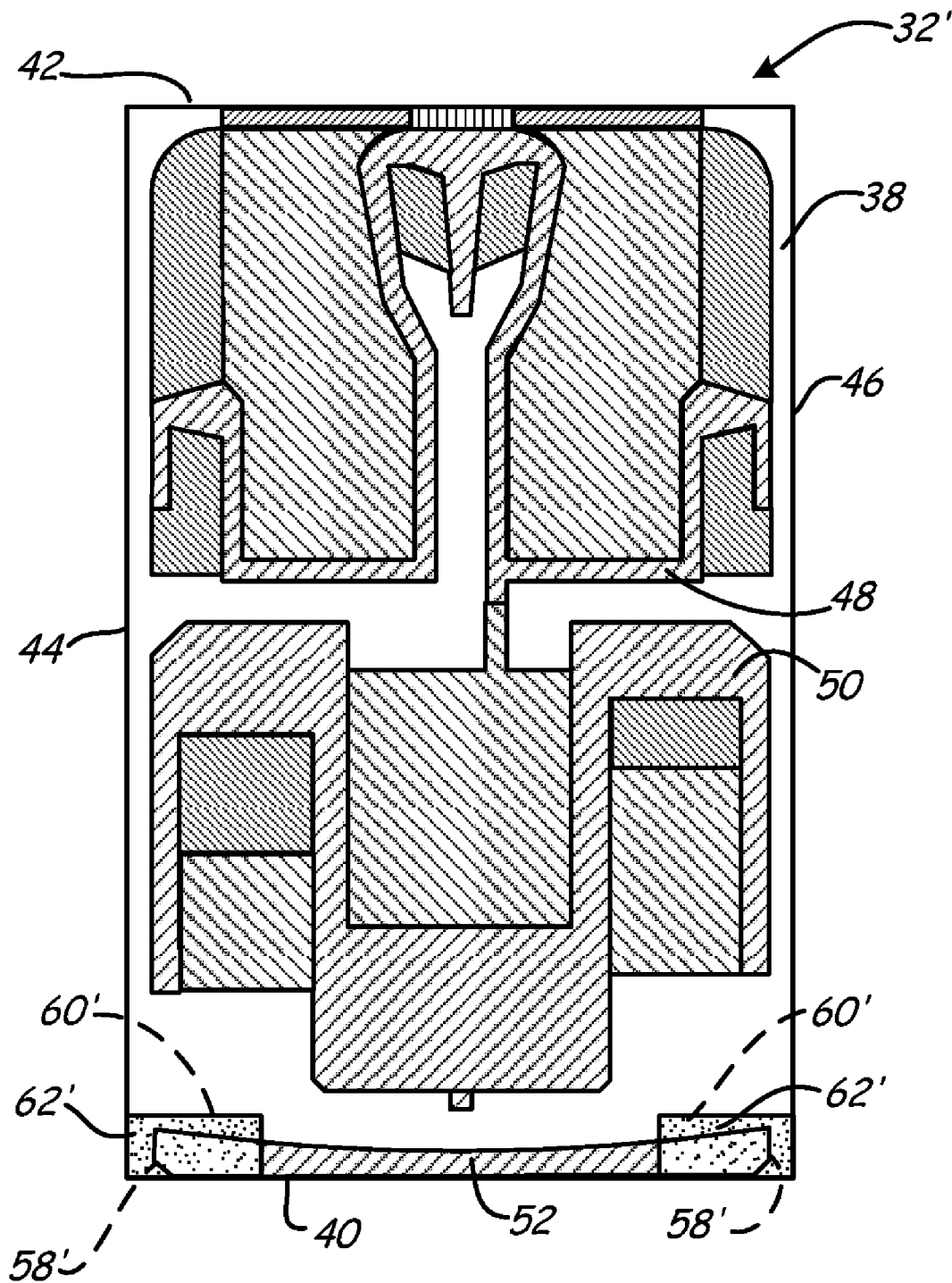
FIG. 3 is another ABS view of a slider according to the present invention.

FIG. 3 is another ABS view of a slider 32' having a slider body 38 with a configuration generally similar to that described above with respect to slider 32, with portions of the slider 32' hatched to represent surfaces at different heights for clarity. However, as illustrated in FIG. 3, a sacrificial layer of material 62' is applied to recesses 58' and 60' in two discrete rectangular areas that each covers a portion of the protrusion 52 near corners of the slider body 38 at the leading edge 40. Bottom surfaces of the sacrificial layer of material 62' lie substantially within a single plane with surfaces of the protrusions 48 and 50, as well as bottom surface portions of the protrusion 52 located adjacent to—but not covered by—the sacrificial layer of material 62', in order to collectively define the ABS. By locating the sacrificial layer of material 62' in discrete areas at corners of the slider 32', the sacrificial layer of material 62' is positioned in locations most likely to contact the storage medium 22 during extreme roll static attitude (RSA) and pitch static attitude (PSA) conditions, while reducing a total amount of the sacrificial material utilized.

Figure 4:
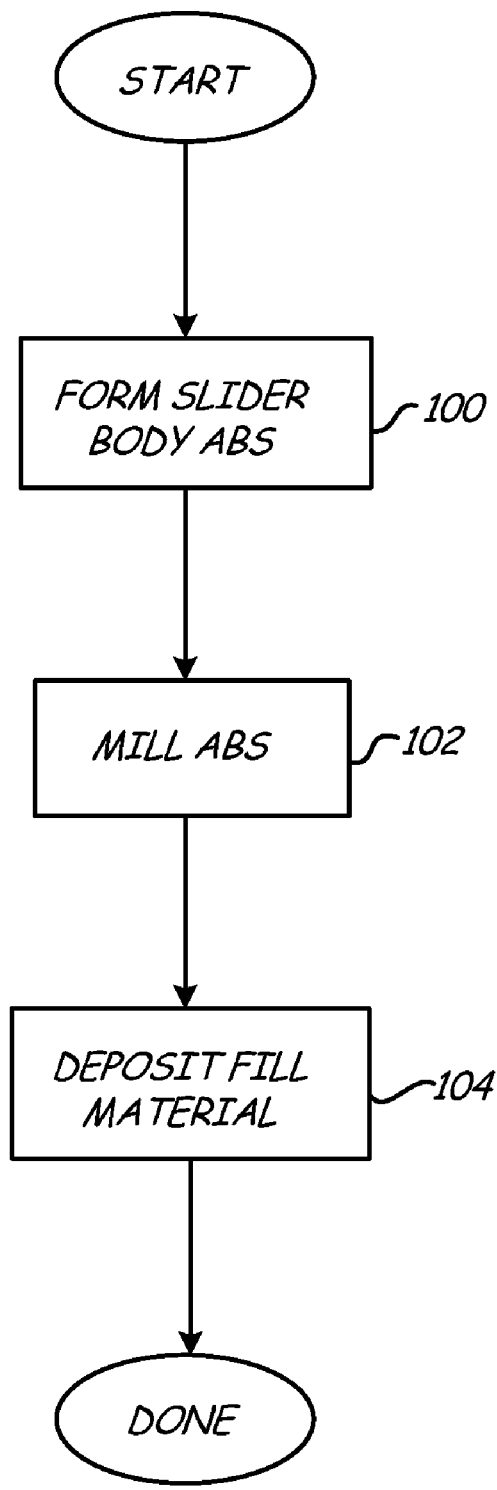
FIG. 4 is a flow chart illustrating a method of manufacturing a slider according to the present invention.

FIG. 4 is a flow chart illustrating a method of manufacturing a slider. Initially, an ABS is formed on a slider body (step 100). The ABS can be formed using conventional techniques, such as photolithography, and milling ceramic material (e.g., AlOTiC) of the slider body to define a desired ABS configuration. Next, at least a portion of the ABS is milled to create one or more recesses in the ceramic material of the slider body (step 102). The milling at step 102 can be performed using known techniques. Then a fill material, that is, a sacrificial layer of material as described above, is deposited into the recesses milled at step 102 (step 104). Deposition can be performed using known techniques. The sacrificial layer of material can be filled to a thickness approximately equal to a depth of the recesses. The milling and filling of steps 102 and 104 can be performed over non-ABS regions of the slider body in addition to ABS regions. Moreover, in alternative embodiments, the sacrificial layer of material can be made to protrude above the ABS when filled in the recesses. Furthermore, it will be appreciated that additional manufacturing steps not specifically mentioned can be performed according to the present invention.

Figure 5A:
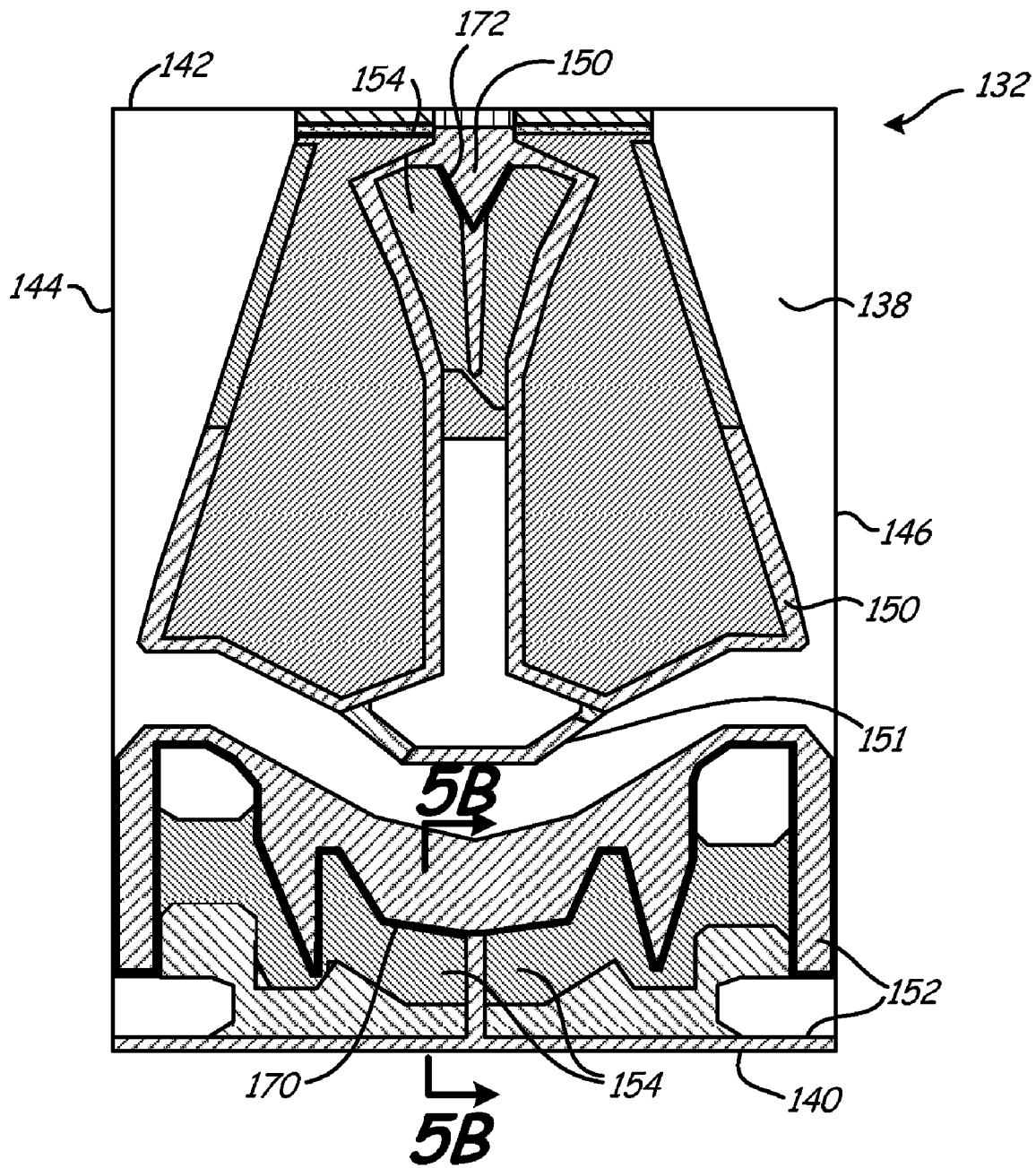
FIG. 5A is another ABS view of a slider according to the present invention.
Figure 5B:
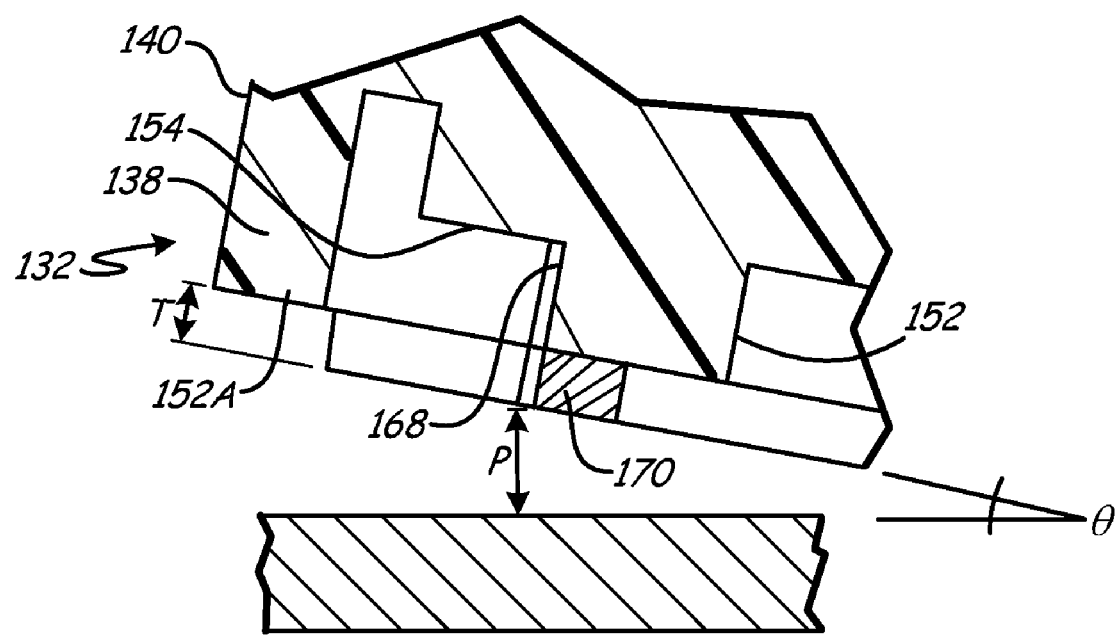
FIG. 5B is a cross-sectional view of the slider, taken along line 5B-5B of FIG. 5A, along with a portion of a storage medium.

FIG. 5A is an ABS view of a slider 132 having a slider body 138 with a leading edge 140, a trailing edge 142, and opposite lateral edges 144 and 146, and FIG. 5B is a cross-sectional view of the slider 132, taken along line 5B-5B of FIG. 5A, along with the storage medium 22 (which may include multiple layers not specifically shown, for simplicity). For clarity, portions of the slider 132 in FIG. 5A are hatched to represent surfaces at different heights. A number of protrusions 150, 151 and 152 extend from the slider body 138, and can be integral with the remainder of the slider body 138. In the illustrated embodiment, a portion of the protrusion 152 forms a comb structure 152A adjacent to the leading edge 140. The protrusions 150 and 151 are located in a generally middle region of the slider body 138. An ABS is defined by surfaces of the protrusions 150, 151 and 152, which are substantially coplanar. Cavities 154 are defined along the slider body 138 adjacent to uptrack edges 168 of at least portions of the protrusions 150, 151 and 152, that is, adjacent to edges of the protrusions 150, 151 and 152 that are generally proximate or facing the leading edge 140. The cavities 154 can have varying depths, and the particular configuration of the cavities 154 can vary as desired for particular applications. As illustrated, blocking features 170 and 172 (shown as heavy lines in FIG. 5A) are located on the protrusions 152 and 150, respectively. More particularly, as illustrated, the blocking features 170 and 172 are located on ABS surfaces of the protrusions 152 and 150 at and aligned with the uptrack edges 168 thereof. The blocking feature 170 has a non-linear shape and extends laterally across substantially an entire width of the slider body 138 between the lateral edges 144 and 146, at a location downtrack from the comb structure 152A. The blocking feature 172 is substantially V-shaped and is positioned near the trailing edge 142. The blocking features 170 and 172 can be made of DLC, which can be applied by selective, focused deposition using known techniques. Alternatively, the blocking features 170 and 172 could be made from other materials such as $SiO_2$, sputtered C, and $Al_2O_3$. Alternatively, the blocking features 170 and 172 could be made integrally with the protrusions 150 and 152 by milling adjacent areas of the protrusions 150 and 152 to lower depths. In this respect, the blocking features 170 and 172 could be made without the deposition of additional material, but would require an additional milling step.

It should be understood that the particular location, shape, and other characteristics of the blocking features 170 and 172 can vary in further embodiments. For instance, few or greater numbers of blocking features can be provided on essentially any protrusions. The configurations of the blocking features 170 and 172 are shown merely by way of example and not limitation.

As shown in FIG. 5B, the blocking features 170 and 172 each have a thickness T, such that the blocking features 170 and 172 extend from the ABS defined by the protrusions 150, 151 and 152. In other words, as shown in FIG. 5B, the blocking features 170 and 172 (only blocking feature 170 is visible in FIG. 5B) extend closer to the storage medium 22 than the ABS surface defined by surfaces of the protrusions 150, 151 and 152 (only the protrusion 152 is visible in FIG. 5B). The thickness T can be selected such that for a given fly pitch angle θ, the blocking features 170 and 172 are positioned closer to the storage medium 22 than downtrack surfaces of the protrusions 150 and 152, without contacting the storage medium 22 and disturbing the fly pitch of the slider 132. For example, the thickness T can be approximately 20 nm, 40 nm, 60 nm or have any other suitable value for particular applications.

It has been found that a clearance between the slider 132 and the storage medium 22 is a significant factor for particle sensitivity of transducing operation. The blocking features 170 and 172 help reduce the clearance between the slider 132 and the storage medium 22 to block particles from progressing downtrack along the ABS. During operation, the blocking features 170 and 172 help limit particle interaction with the ABS at downtrack locations by providing a physical barrier to particles having a diameter (or other major dimension) P or greater. In this way, the blocking features 170 and 172 provide focused particle blocking functionality at sensitive locations of the ABS, and can help block particles of diameter P that can pass by the comb structure 152A.

Figure 5C:
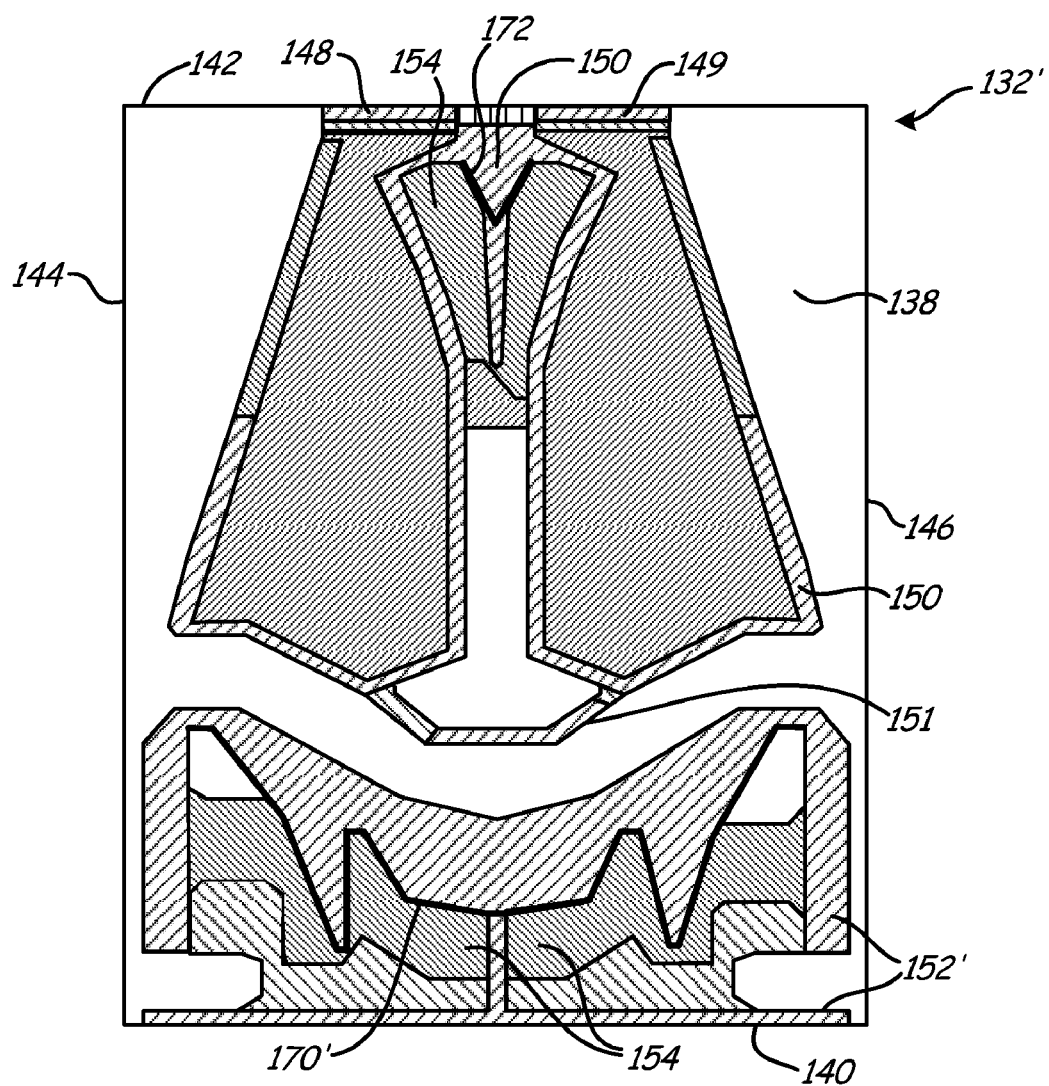
FIG. 5C is another ABS view of a slider according to the present invention.

FIG. 5C is another ABS view of a slider 132'. The slider 132' is generally similar to the slider 132 described above. However, the slider 132' has a different ABS configuration defines by protrusions 150 and 152'. Blocking features 170 and 172' are defined along edges of portions of the protrusions 150 and 172', respectively.

Figure 6:
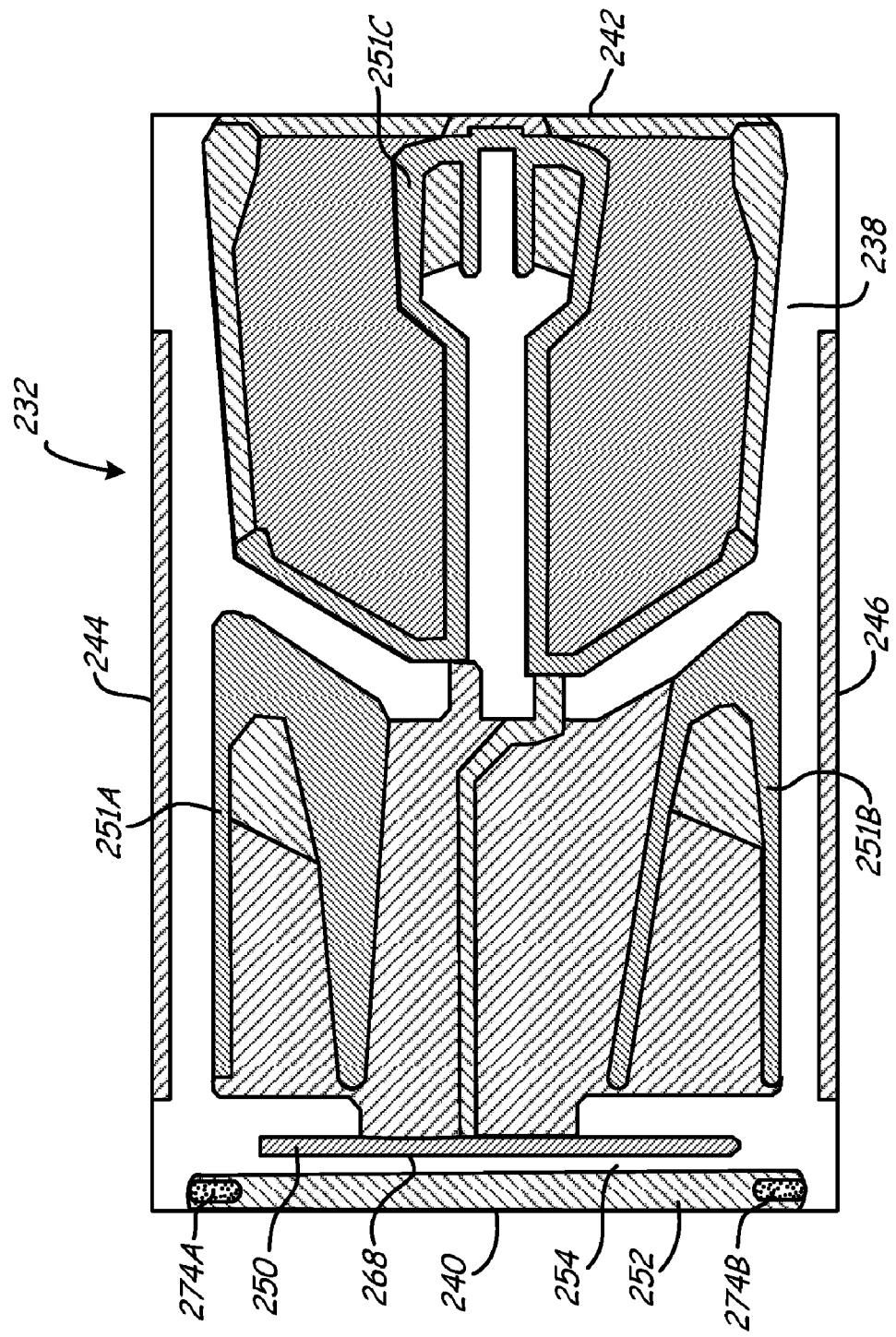
FIG. 6 is another ABS view of a slider according to the present invention.

FIG. 6 is another ABS view of a slider 232 having a slider body 238 with a leading edge 240, a trailing edge 242, and opposite lateral edges 244 and 246. For clarity, portions of the slider 232 in FIG. 6 are hatched to represent surfaces at different heights. A number of protrusions 250, 251A, 251B, 251C and 252 extend from the slider body 238, and can be integral with the remainder of the slider body 238. In the illustrated embodiment, the protrusion 252 forms a comb structure at the leading edge 240. The protrusions 250 and 251A-251C are located in a generally middle region of the slider body 238, with the protrusion 250 located adjacent to and dowtrack from the protrusion 252. An ABS is defined by surfaces of the protrusions 250 and 251A-251C, which are substantially coplanar. At least one cavity 254 is defined along the slider body 238 adjacent to an uptrack edge 268 of at least portions of the protrusion 250, that is, adjacent to edges of the protrusion 250 that are generally proximate or facing the leading edge 240. The cavity 254 can have varying depth, and the particular configuration of the cavity 254 can vary as desired for particular applications. As illustrated, pads 274A and 274B are located on the protrusion 252, at generally opposite lateral ends of the protrusion 252. The pads 274A and 274B can be made of a sacrificial layer of material, such as a material of the type described above, deposited on the protrusion 252. The protrusion 252 can have a lower height than the protrusion 250, and bottom surfaces of the pads 274A and 274B can be substantially co-planar with the ABS defined by bottom surfaces of the protrusions 250 and 251A-251C. The protrusion 250 can define another comb for particle mitigation, such that the protrusions 250 and 252 form adjacent spaced-apart combs. The pads 274A and 274B can act as bumpers. The pads 274A and 27B can be spaced slightly from the extreme leading edge 240, which can allow the slider 232 additional time to contact with a storage medium under negatively-pitched conditions. Moreover, the sacrificial layer of material forming the pads 274A and 274B can help mitigate storage medium scratching and particle generation. In particular, the location of the pads 274A and 274B near the corners of the slider body 238 (i.e., near the intersection of the leading edge 240 with the lateral edges 244 and 246) helps mitigate scratching and particle generation in locations where contact between the slider 232 and a storage medium is most likely to occur and otherwise would be potentially more detrimental due to the relatively sharp corners of the slider body 238.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, the present invention can be utilized with ABS designs other than those illustrated in the appended drawings. Moreover, features of one disclosed embodiment of the present invention can be utilized separately from or in conjunction with features of any other disclosed embodiment.

The invention claimed is:
1. An apparatus comprising:
  a ceramic slider body having a leading edge and an opposite trailing edge, the slider body further having a top face and a bottom face each extending between the leading edge and the trailing edge, the slider body further including a plurality of ceramic protrusions extending from the bottom face;
  a first recess defined on one of the protrusions such that at least a portion of said one of the protrusions does not extend as far from the bottom face as others of said plurality of ceramic protrusions; and an amorphous sacrificial layer deposited on the slider body in the recess, wherein a bottom surface of the sacrificial layer extends at least as far from the bottom face as bottom surfaces of the others of said plurality of protrusions.

2. The apparatus of claim 1, wherein the sacrificial layer comprises a material with a lower Hertzian contact potential than a material of the slider body.

3. The apparatus of claim 1, wherein the bottom surface of the sacrificial layer and the bottom surfaces of the plurality of protrusions lie substantially within a single plane.

4. The apparatus of claim 1, wherein the sacrificial layer comprises diamond-like carbon or sputtered carbon.

5. The apparatus of claim 1, wherein the sacrificial layer comprises $SiO_2$ or $Al_2O_3$.

6. The apparatus of claim 1, wherein the sacrificial layer is deposited adjacent to the leading edge of the slider body.

7. The apparatus of claim 1, wherein the plurality of protrusions include a first protrusion and a second protrusion, wherein the first protrusion and the second protrusion are spaced from one another with a cavity therebetween, and wherein the first recess is located on the first protrusion adjacent to the cavity.

8. The apparatus of claim 7, wherein a second recess is located in the cavity and the sacrificial layer is also deposited in the second recess.

9. The apparatus of claim 1, wherein the slider body comprises AlOTiC.

10. The apparatus of claim 1, wherein the sacrificial layer is deposited to cover a rectangular area.

11. The apparatus of claim 1, wherein the bottom surface of the sacrificial layer and the bottom surface of the protrusion define an air bearing surface.

12. The apparatus of claim 1, wherein the plurality of ceramic protrusions are integral with the ceramic slider body.

13. An apparatus comprising:
a slider body having a leading edge and an opposite trailing edge, the slider body further having a top face and a bottom face each extending between the leading edge and the trailing edge, the slider body further including a plurality of protrusions extending from the bottom face with one of the protrusions positioned adjacent to the leading edge;
a first recess defined in the protrusion positioned adjacent to the leading edge such that at least a portion of said protrusion positioned adjacent to the leading edge does not extend as far from the bottom face as others of said plurality of protrusions;
a sacrificial layer deposited in the recess to fill the recess, wherein a bottom surface of the sacrificial layer extends at least as far from the bottom face as the bottom surface of the others of said plurality of protrusions; and wherein said sacrificial layer comprises diamond-like carbon, sputtered carbon, $SiO_2$ or $Al_2O_3$.

14. The apparatus of claim 13, wherein the slider body comprises a ceramic material, and wherein the sacrificial layer comprises diamond-like carbon or sputtered carbon.

15. The apparatus of claim 13, wherein the slider body comprises a ceramic material, and wherein the sacrificial layer comprises $SiO_2$ or $Al_2O_3$.

16. The apparatus of claim 13, wherein the sacrificial layer is deposited adjacent to the leading edge of the slider body.

17. The apparatus of claim 13, wherein the plurality of protrusions are integral with the slider body.

18. The apparatus of claim 13, wherein the slider body comprises AlOTiC.

19. The apparatus of claim 13, wherein the bottom surface of the sacrificial layer and the bottom surface of the protrusion define an air bearing surface.

20. The apparatus of claim 19, wherein the bottom surface of the sacrificial layer and the bottom surface of the protrusion are substantially coplanar.

* * * * *